US007477417B1

(12) United States Patent
Hamashima et al.

(10) Patent No.: US 7,477,417 B1
(45) Date of Patent: Jan. 13, 2009

(54) IMAGE PROCESSING SYSTEM

(75) Inventors: Mitsuhiro Hamashima, Tokyo (JP); Yasuko Deushi, Tokyo (JP); Hiroyuki Soshi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 638 days.

(21) Appl. No.: 09/648,590

(22) Filed: Aug. 25, 2000

(30) Foreign Application Priority Data
Sep. 7, 1999 (JP) ................................. 11-252920

(51) Int. Cl.
*G06F 15/00* (2006.01)
*H04N 1/46* (2006.01)
*G06K 9/03* (2006.01)

(52) U.S. Cl. ........................ 358/1.9; 358/537; 382/311

(58) Field of Classification Search ................. 358/1.9, 358/518, 537, 536, 538, 539, 531, 540, 452, 358/453, 464, 1.13, 1.18; 382/162, 167, 382/309, 311, 284, 291, 295, 181
See application file for complete search history.

(56) References Cited

U.S. PATENT DOCUMENTS

| | | | | |
|---|---|---|---|---|
| 4,033,059 A * | 7/1977 | Hutton et al. | ............. | 283/91 |
| 4,649,435 A * | 3/1987 | Kramer | ............. | 358/426.01 |
| 4,785,164 A * | 11/1988 | Reed et al. | ............. | 235/64.7 |
| 4,794,421 A * | 12/1988 | Stoudt et al. | ............. | 399/184 |
| 4,975,768 A | 12/1990 | Takaraga | ............. | 358/75 |
| 5,017,963 A * | 5/1991 | Tuhro | ............. | 399/190 |
| 5,142,335 A | 8/1992 | Fujima | ............. | 358/75 |
| 5,345,313 A * | 9/1994 | Blank | ............. | 348/598 |
| 5,583,646 A * | 12/1996 | Yamamoto et al. | ............. | 358/296 |
| 5,781,198 A * | 7/1998 | Korn | ............. | 345/634 |
| 5,848,225 A * | 12/1998 | Nickell et al. | ............. | 358/1.9 |
| 5,853,197 A * | 12/1998 | Mowry, Jr. et al. | ............. | 283/93 |
| 5,909,539 A * | 6/1999 | Chikauchi | ............. | 358/1.18 |
| 5,923,380 A * | 7/1999 | Yang et al. | ............. | 348/586 |
| 5,970,471 A * | 10/1999 | Hill | ............. | 705/26 |
| 6,000,728 A * | 12/1999 | Mowry, Jr. | ............. | 283/93 |
| 6,014,462 A * | 1/2000 | Yamakawa | ............. | 382/200 |
| 6,069,976 A * | 5/2000 | Kim | ............. | 382/239 |
| 6,088,479 A * | 7/2000 | Ikeshoji et al. | ............. | 382/170 |
| 6,118,895 A * | 9/2000 | Hirota et al. | ............. | 382/165 |
| 6,198,841 B1 * | 3/2001 | Toyama et al. | ............. | 382/164 |
| 6,204,873 B1 * | 3/2001 | Shimazaki | ............. | 347/172 |
| 6,373,514 B1 * | 4/2002 | Nakatani | ............. | 347/240 |

(Continued)

FOREIGN PATENT DOCUMENTS

EP 0 432 969 8/1992

(Continued)

*Primary Examiner*—Madeleine A Nguyen
(74) *Attorney, Agent, or Firm*—patenttm.us

(57) ABSTRACT

An image processing system including an image processing unit for processing input image data and an output unit for outputting an image processed in the image processing unit. The image processing unit has the function of cutting out a background portion of the image and effecting color specification and further has the function of specifying a method of processing the background portion. When printing the image, the output unit recognizes the background portion on the basis of the color specification and carries out background processing for the recognized background portion on the basis of the specified background processing method. It is possible to prevent visible unevenness of printing from occurring in the background portion.

6 Claims, 3 Drawing Sheets

U.S. PATENT DOCUMENTS

| | | | |
|---|---|---|---|
| 6,490,006 B1 * | 12/2002 | Monjo | 348/587 |
| 6,603,880 B2 * | 8/2003 | Sakamoto | 382/173 |
| 6,628,425 B1 * | 9/2003 | Carrasco Martinez | 358/1.9 |
| 6,628,833 B1 * | 9/2003 | Horie | 382/173 |
| 6,692,030 B1 * | 2/2004 | Phillips | 283/91 |
| 6,809,742 B1 * | 10/2004 | Motosugi et al. | 345/619 |
| 2002/0030739 A1 * | 3/2002 | Nagaya et al. | 348/143 |
| 2002/0061063 A1 * | 5/2002 | Otto | 375/240.03 |

FOREIGN PATENT DOCUMENTS

| | | |
|---|---|---|
| JP | 1-152478 | 6/1989 |
| JP | 3-189878 | 8/1991 |
| WO | 90 10251 | 9/1990 |

* cited by examiner (Host - side processing)

IMAGE PROCESSING SYSTEM

BACKGROUND OF THE INVENTION

1. Field of the Invention

The present invention relates to image processing methods and printers.

2. Description of Background Art

In general, photographs of individuals contain a scene as a background. In many cases, such photographs cannot suitably be used as pictures for identification or the like as they are. Accordingly, it is conventional practice to remove the background and to print (solid printing) the resulting vacant portion with Bk (black) or the like with a uniform density.

However, when the background of a person's image or the like is subjected to solid printing, visible unevenness of printing occurs unfavorably because completely uniform solid printing cannot be effected owing to uneven ink coating on the transfer ribbon, variations in the energy applied to the thermal head, etc.

SUMMARY OF THE INVENTION

In view of the above-described problem with the conventional technique, an object of the present invention is to prevent visible unevenness of printing from occurring in the background portion of an image.

To attain the above-described object, the present invention provides an image processing system including an image processing unit for processing input image data and an output unit for outputting an image processed in the image processing unit. The image processing unit has the function of cutting out a background portion of the image and effecting color specification and further has the function of specifying a method of processing the background portion. When printing the image, the output unit recognizes the background portion on the basis of the color specification and carries out background processing for the recognized background portion on the basis of the specified background processing method.

Preferably, the output unit converts pixels into a pattern and prints the background portion with a discontinuous pattern on the basis of the specified background processing method.

Preferably, the pattern is a stripe pattern or a dot pattern.

Preferably, the color specification specifies a uniform density of a specific color.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

An embodiment of the present invention will be described below with reference to the accompanying drawings.

Figure 1:
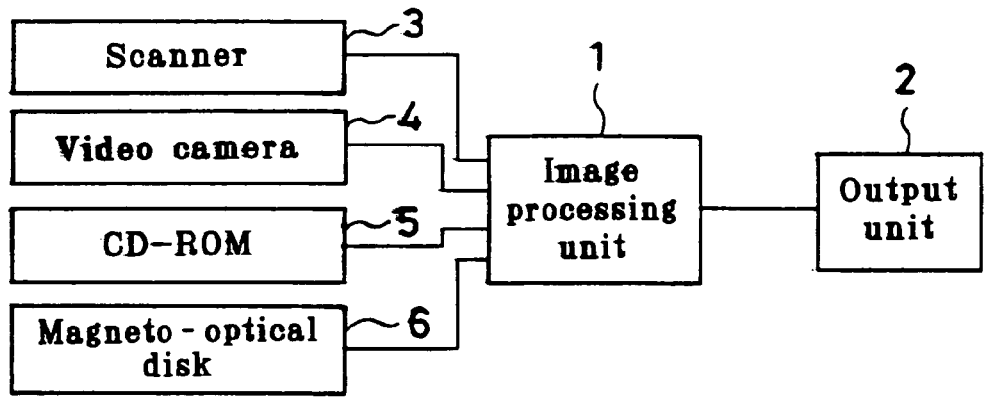
FIG. 1 is a block diagram illustrating the system configuration of the present invention.

FIG. 1 is a block diagram illustrating the system configuration of the present invention. The image processing system according to the present invention includes an image processing unit 1 for processing image data and an output unit 2. The output unit 2 includes a display, a printer, etc. for outputting an image processed in the image processing unit 1. Image data may be captured with a scanner 3 connected directly to the image processing system or with a video camera 4 connected to the image processing system via a video terminal. It is also possible to read image data already stored in the form of digital data on a CD-ROM 5 or a magneto-optical disk 6.

Figure 2:
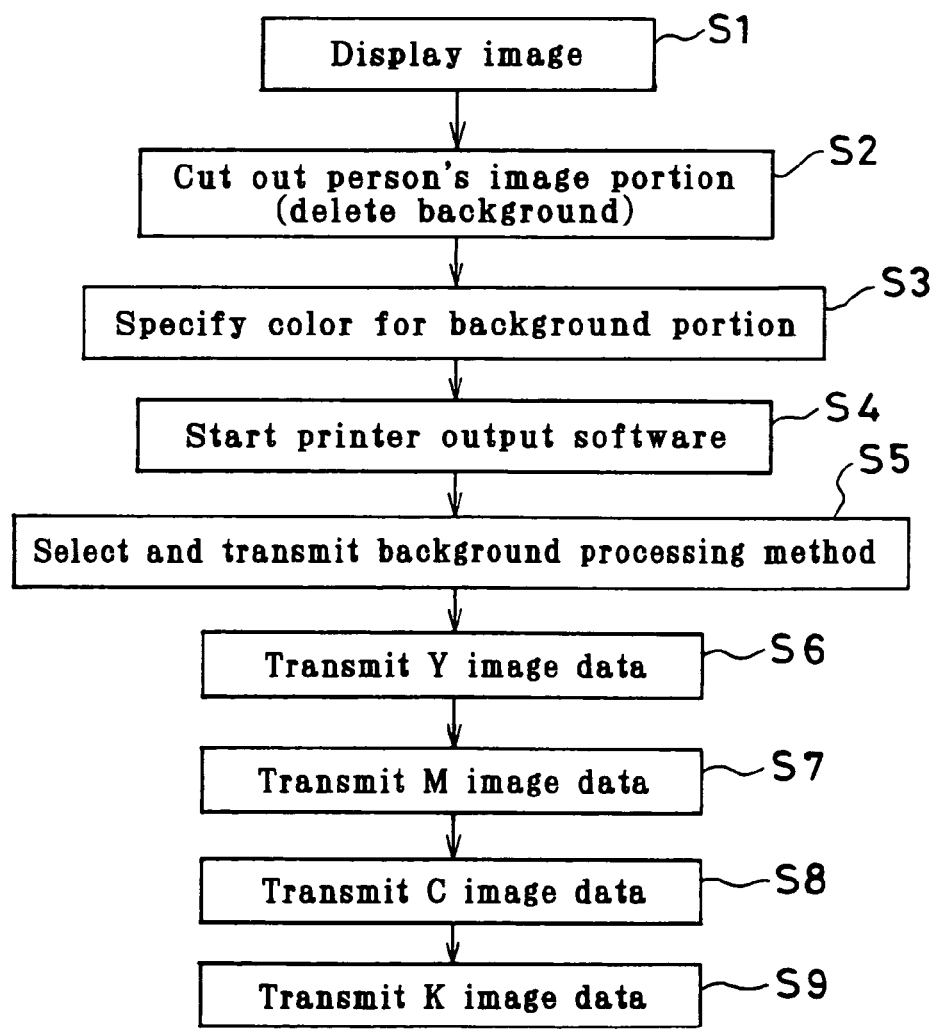
FIG. 2 is a flowchart showing host-side process flow.
Figure 3:
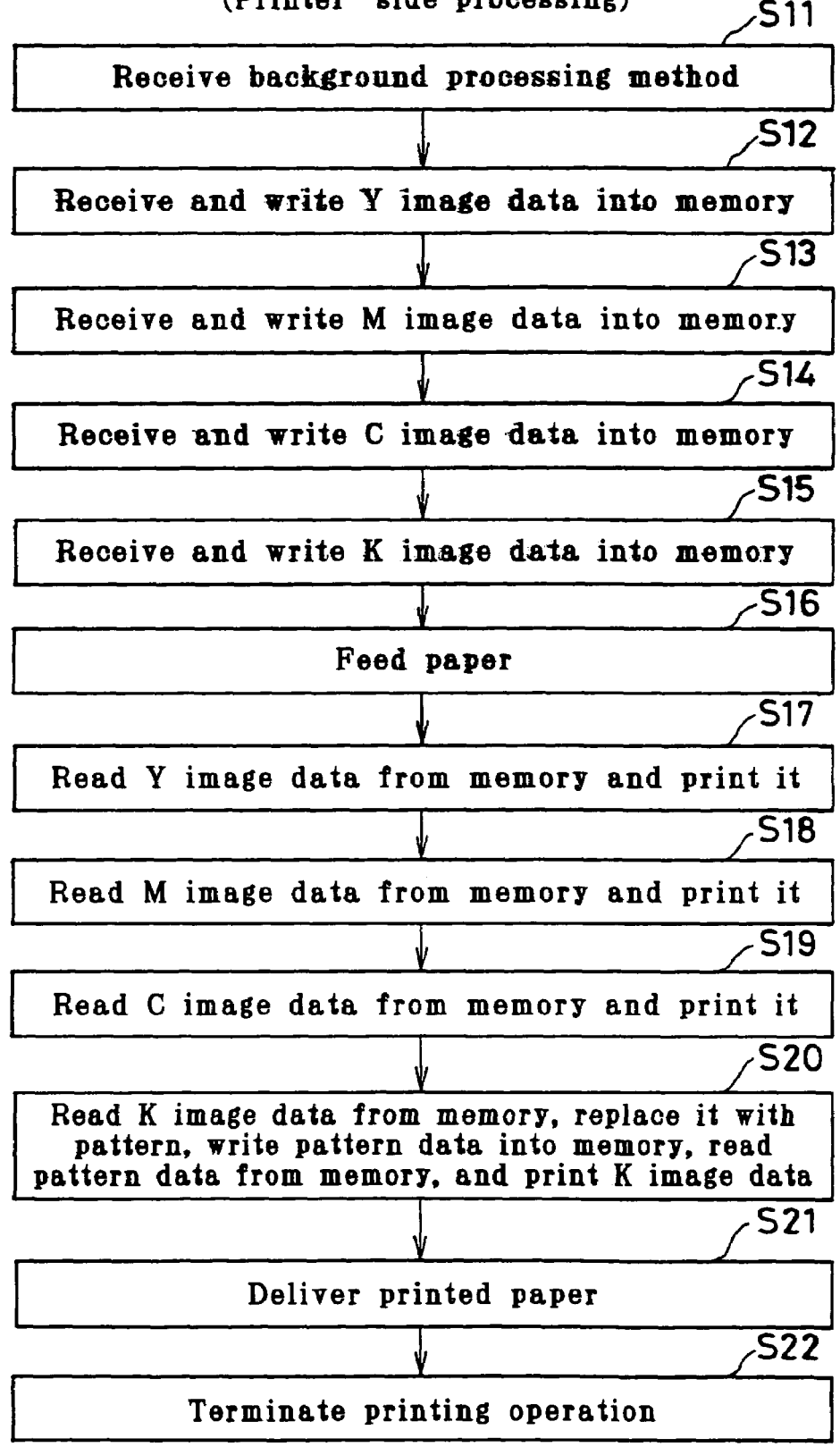
FIG. 3 is a flowchart showing printer-side process flow.
Figure 4:
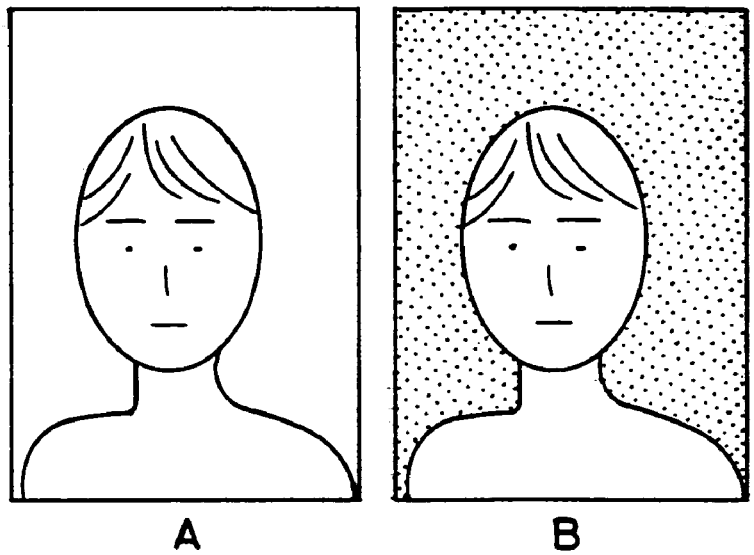
FIGS. 4(A) through 4(E) comprises a diagram illustrating background processing according to the present invention.
Figure 4:
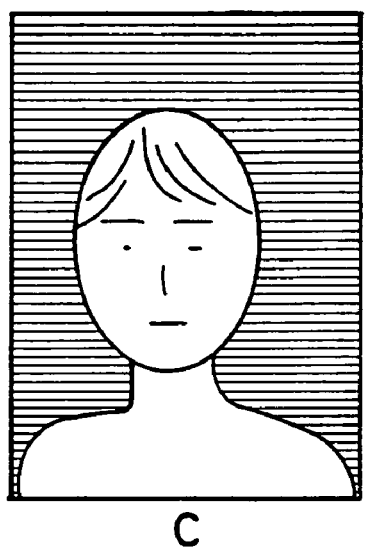
Figure 4:
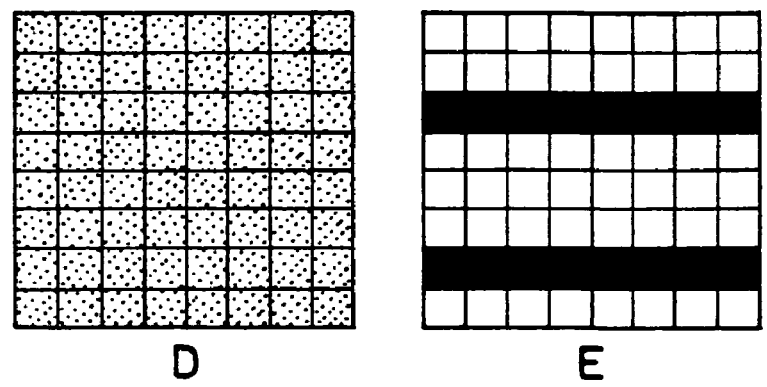

Next, image processing according to the present invention will be described with reference to FIGS. 2 to 4 in regard to an example in which clipping is carried out by a manual operation, and a background pattern is manually synthesized, and then the processed image is outputted to a printer. FIG. 2 is a flowchart showing process flow carried out by the image processing unit of the present invention. FIG. 3 is a flowchart showing printer-side process flow. FIG. 4 is a diagram illustrating background processing.

First, processing carried out by the image processing unit (host-side processing) will be described with reference to FIG. 2. A desired image previously stored in an external storage unit is displayed on a display (step S1). The image is composed of R (red), G (green) and B (blue), each represented by 8 bits. On the display, the image is displayed as an image of three colors, i.e. C (cyan), M (magenta) and Y (yellow), for example, as follows:

C=255-R, M=255-G, Y=255-B

In general, photographs of individuals contain a scene as a background. In many cases, such photographs cannot suitably be used as pictures for identification as they are. Accordingly, as shown in part (A) of FIG. 4, a person's image portion of the displayed image is cut out (i.e. the background is deleted) by using publicly known retouching software (step S2). Next, a color to be used for the deleted background portion is specified. For example, Bk (black) with 64 gradations is specified as shown in part (B) of FIG. 4 (step S3). Next, printer output software is started (step S4) to output the processed image to the printer. In outputting the image, a background processing method (described later) is specified by the printer or output software, and information indicating the specified background processing method is transmitted to the printer (step S5). After the background processing method has been specified, Y, M, C and K image data items are transferred to the printer (steps S6 to S9).

Next, printer-side processing will be described with reference to FIG. 3. The printer receives the information indicating the specified background processing method (step S11). The printer also receives the Y, M, C and K image data items and writes them into respective memories (steps S12 to S15). After receiving all of the image data, the printer feeds paper (step S16) and commences printing. For example, the printer reads the image data items from the respective memories in field sequence, i.e. Y, M and C, to carry out printing (steps S17 to S19). At the step of carrying out printing of the K image data for the background portion, the printer reads the K image data from the associated memory and performs conversion of the K image data into pattern data, writing and reading of the pattern data into and from a memory and printing of the K image data (step S20). In a case where non-processing has been specified as a background processing method, for example, the K printing process is also effected faithfully to the image data as shown in part (B) of FIG. 4. If patterning with horizontal lines has been specified as a background processing method, the printer recognizes, prior to printing, that Bk with 64 gradations has been specified in the received data, and converts pixels into a pattern. For example, each series of vertical 4 dots of 8×8=64 pixels as shown in part (D) of FIG. 4 is replaced with 1 dot with 255 gradations as shown in part (E) of FIG. 4. Consequently, as shown in part (C) of FIG. 4, an image with the background replaced with horizontal lines drawn at intervals of 4 dots is outputted. If the background is reproduced as a striped discontinuous image area in this way, it is difficult to recognize unevenness in printing of the stripes relative to the surroundings. Thus, unevenness of density and color can be made difficult to perceive by the eye. Stripes to be printed in the background are not necessarily limited to horizontal lines but may be vertical lines, oblique lines, etc. Further, patterns to be printed in the background are not necessarily limited to stripes but may be dots or the like. By reproducing the background as a discontinuous image area using a dot or other similar pattern, it is also possible to make unevenness of density and color difficult to perceive by the eye.

Although in the above-described embodiment the color for the background is specified as a single color, i.e. K, the present invention is not necessarily limited thereto. For example, the color for the background may be specified as C=M=Y=64 gradations, and the whole image, including the background, may be handled in the form of three-color image data, i.e. C, M and Y. In this case, a portion of the image data that has a specific combination of three colors. (C, M and Y) is judged to be a background, and this portion is subjected to background processing. If ink used in the printer consists of four colors, i.e. C, M, Y and K, a portion of C=M=Y=64 gradations is judged to be a background, and this portion is replaced with K=64 gradations, for example. The replacement may be performed when the image is transferred from the host side. Alternatively, the replacement may be performed on the printer side on the basis of the received image. In this case, there is a possibility that data concerning a person's image portion may contain an area of C=M=Y=64 gradations. If this portion is replaced as in the case of the background processing, the resulting image may appear unnatural. In the case of a natural image, however, there is little probability that an area having the same combination of gradation values will be contiguously present around it. Therefore, there is a strong possibility that such replacement may be visually disregarded. Alternatively, to prevent the occurrence of the above-described problem, processing may be carried out as follows. Regarding a pixel noticed and 8 surrounding pixels, i.e. a total of 3×3 pixels, if all of the pixels have a predetermined combination of gradation values, this area is judged to be a background. If all of the 3×3 pixels do not have a predetermined combination of gradation values, the area is judged to be a natural image. Only the area judged to be a background is subjected to the background processing. In these cases also, data representing K=64 gradations may be replaced with a pattern, e.g. lines, according to the specified background processing as in the case of the above.

In a case where ink used in the printer consists of three colors, i.e. C, M and Y, data concerning the background is replaced with K data, and this is further replaced with a pattern. Then, the data is returned to a combination of three colors, i.e. C, M and Y. By doing so, a similar effect can be produced. If K=64 is replaced with horizontal lines drawn at intervals of 4 dots as in the above-described example, printing is effected with K=255. In this case, it is possible to print the background with a desired color while pattering it by using a desired combination of three colors, e.g. C=255, M=200 and Y=180. In this case, background processing may be carried out directly, without performing replacement with K data, by judging a portion of C=M=Y=64 to be a background.

In the foregoing embodiments, the present invention has been described with regard to a case where the background has a uniform density. It should be noted, however, that gradation may be given to the background, or a design may be put in the background. In the above-described example, gradation can be given to the background by changing the gradation values of the straight lines or changing the line pitch. It is also possible to represent only the background by the dot area modulation method, for example, on the basis of 4×4 data concerning the original image instead of using straight lines.

As has been stated above, according to the present invention, the background of an image is reproduced as a discontinuous image area using a pattern such as a stripe pattern. Consequently, it is difficult to recognize unevenness in printing of the pattern relative to the surroundings. Thus, unevenness of density and color can be made difficult to perceive by the eye.

It should be noted that the present invention is not limited to the foregoing embodiments but can be modified in a variety of ways.

What is claimed is:

1. An image processing system comprising:
    an image processing unit for processing input photograph images; and
    an output unit for outputting an image processed in the image processing unit;
    wherein said image processing unit has a function of cutting out a background portion of the photographic image and effecting a color specification for said cut out background portion of the image and further has a function of specifying a method of processing the background portion, and when printing the photographic image, said output unit recognizes the background portion on basis of said color specification specified by said image processing unit and carries out background processing for the recognized background portion on basis of said specified method of processing the background portion to replace the background portion of the photographic image with a background pattern adapted to be printed without creating areas of perceptible unevenness, to avoid visual unevenness from accruing in the background portion,
    wherein said output unit converts pixels into the background pattern and replaces the background portion of the photographic imagery with a printed discontinuous pattern on basis of the specified method of processing the background portion, and
    wherein said discontinuous pattern is chosen from a group consisting of a stripe pattern and a dot pattern.

2. An image processing system according to claim 1, wherein said color specification specifies a uniform density of a specific color.

3. An image processing system according to claim 1, wherein said input image comprises a photograph image of a person.

4. An image processing system according to claim 3, wherein said image processing system thereby replaces a background portion of the photograph image of a person with a background suitable for identification photograph use.

5. An image processing system according to claim 1, wherein said image processing unit recognizes the boundary between the image and the background portion of the image to define the background portion for cutting out.

6. An image processing method comprising the steps of:
    replacing a background portion of a photographic image with a specified background indicator design;

specifying a method of processing the background portion; and transmitting the image with the background portion replaced by the specified background indicator design, and information indicating the specified method of processing the background portion; and at an output unit:

receiving said image with the background portion replaced by the specified background indicator design and information indicating the method of processing the background portion;

said output unit recognizing the background portion by detecting the specified background indicator design in the received image data; and said output unit processing the recognized background portion according to the received method of processing to replace the background indicator design of the background portion with a background pattern capable of being printed substantially without unevenness perceptible to the human eye, to provide an output image that avoids visual unevenness from accruing in the background portion, wherein the background pattern is discontinuous, and wherein the discontinuous background pattern is chosen from a group consisting of a striped pattern and a dotted pattern.

* * * * *